(12) United States Patent
Verma

(10) Patent No.: US 11,016,978 B2
(45) Date of Patent: May 25, 2021

(54) JOINER FOR DISTRIBUTED DATABASES

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 133 days.

(21) Appl. No.: 16/574,802

(22) Filed: Sep. 18, 2019

(65) Prior Publication Data

US 2021/0081424 A1 Mar. 18, 2021

(51) Int. Cl.
*G06F 16/00* (2019.01)
*G06F 16/2455* (2019.01)
*G06F 16/2457* (2019.01)

(52) U.S. Cl.
CPC .... *G06F 16/24568* (2019.01); *G06F 16/2456* (2019.01); *G06F 16/24578* (2019.01)

(58) Field of Classification Search
CPC ......... G06F 16/24568; G06F 16/24578; G06F 16/2456
USPC ........................................................ 707/758
See application file for complete search history.

(56) References Cited

U.S. PATENT DOCUMENTS

| 4,799,152 | A | 1/1989 | Chuang et al. |
| 5,210,870 | A | 5/1993 | Baum et al. |
| 5,557,791 | A | 9/1996 | Cheng et al. |
| 5,802,357 | A | 9/1998 | Li et al. |
| 5,848,408 | A | 12/1998 | Jakobsson et al. |
| 5,873,074 | A | 2/1999 | Kashyap et al. |
| 5,960,428 | A | 9/1999 | Lindsay et al. |
| 5,983,215 | A | 11/1999 | Ross et al. |
| 5,991,754 | A | 11/1999 | Raitto et al. |
| 6,003,024 | A | 12/1999 | Bair et al. |
| 6,374,235 | B1 | 4/2002 | Chen et al. |
| 6,397,204 | B1 | 5/2002 | Liu et al. |
| 6,493,701 | B2 | 12/2002 | Ponnekanti |
| 6,636,870 | B2 | 10/2003 | Roccaforte |
| 6,968,335 | B2 | 11/2005 | Bayliss et al. |
| 7,054,852 | B1 | 5/2006 | Cohen |

(Continued)

FOREIGN PATENT DOCUMENTS

| WO | WO 97/11433 | 3/1997 |
| WO | WO 2015155846 | 10/2015 |

OTHER PUBLICATIONS

U.S. Appl. No. 16/574,861, filed Sep. 18, 2019, Sandeep Verma.

*Primary Examiner* — Thanh-Ha Dang
(74) *Attorney, Agent, or Firm* — Michael A. Springs

(57) ABSTRACT

A joiner accesses a first sorted dataset and a second sorted dataset. Each dataset includes a corresponding plurality of data blocks, each including a set of records. Each record is associated with a corresponding record key. A set of first records for each first data block of the first dataset is arranged based on values of the first record keys. A set of second records for each second data block of the second dataset is arranged based on values of the second record keys. A first root element is extracted from the first sorted dataset. A second root element is extracted from the second sorted dataset. In response to determining that the first and second root elements match, an output is generated by joining the first record associated with the first root element with the second record associated with the second root element.

20 Claims, 4 Drawing Sheets

(56) References Cited

U.S. PATENT DOCUMENTS

| | | | |
|---|---|---|---|
| 7,085,769 B1 | 8/2006 | Luo et al. | |
| 7,293,024 B2 * | 11/2007 | Bayliss | G06F 7/32 |
| 7,370,068 B1 | 5/2008 | Pham et al. | |
| 7,376,668 B2 | 5/2008 | Smith et al. | |
| 7,512,600 B2 | 3/2009 | Al-Omari et al. | |
| 7,882,100 B2 | 2/2011 | Andrei | |
| 7,895,216 B2 * | 2/2011 | Longshaw | G06F 16/2246 707/752 |
| 7,966,343 B2 | 6/2011 | Yang et al. | |
| 8,073,840 B2 * | 12/2011 | Smith | G06F 16/2456 707/714 |
| 8,086,598 B1 * | 12/2011 | Lamb | G06F 16/24544 707/714 |
| 8,145,806 B2 | 3/2012 | Lee et al. | |
| 8,166,462 B2 * | 4/2012 | Kosche | G06F 11/3466 717/130 |
| 8,463,736 B2 * | 6/2013 | Bakalash | G06F 16/283 707/600 |
| 8,935,487 B2 | 1/2015 | Sengupta et al. | |
| 8,983,919 B2 * | 3/2015 | Gislason | G06F 16/254 707/696 |
| 9,053,032 B2 | 6/2015 | Sengupta et al. | |
| 9,262,479 B2 | 2/2016 | Deshmukh et al. | |
| 9,378,211 B2 | 6/2016 | Hirsch et al. | |
| 9,721,000 B2 | 8/2017 | Jain et al. | |
| 9,785,666 B2 | 10/2017 | Li et al. | |
| 10,067,954 B2 * | 9/2018 | Kociubes | G06F 16/211 |
| 10,157,193 B2 | 12/2018 | Attaluri et al. | |
| 10,158,483 B1 | 12/2018 | Newman | |
| 2007/0043755 A1 | 2/2007 | Rölleke | |
| 2008/0120314 A1 * | 5/2008 | Yang | G06F 16/2456 |
| 2014/0149841 A1 | 5/2014 | Magar et al. | |
| 2017/0060921 A1 * | 3/2017 | Furusho | G06F 16/2228 |
| 2018/0004813 A1 * | 1/2018 | Smith | G06F 16/2237 |
| 2018/0018362 A1 * | 1/2018 | Asai | G06F 16/2379 |
| 2018/0075101 A1 | 3/2018 | Amor et al. | |

* cited by examiner

JOINER FOR DISTRIBUTED DATABASES

TECHNICAL FIELD

The present disclosure relates generally to distributed databases. More particularly, in certain embodiments, the present disclosure is related to a joiner for distributed databases.

BACKGROUND

Data may be stored in a database in the form of one or more data tables or data block. This data may be distributed across multiple servers in a distributed server architecture. In some cases, an individual may wish to search for a desired subset of information within this distributed data or to view a portion of the distributed data. To achieve this, the data may need to be sorted, and, in some cases, information distributed to different data tables or data blocks may need to be combined or joined. There exists a need for improved tools for sorting and joining such data.

SUMMARY

There is currently an increasing demand for the analysis of large and distributed datasets, which may include multiple data tables or data blocks, storing data that may originate from a variety of data sources. This disclosure encompasses the recognition of previously unrecognized problems associated with sorting and/or joining such datasets and also provides unique solutions to these problems. For example, in conventional approaches to sorting information stored in one or more data tables, the data tables may be duplicated and/or altered (e.g., rearranged) in order to sort and/or join the data as desired. Conventional approaches such as this are associated with several disadvantages including, for example, the consumption of large amounts of memory and processing resources. For instance, prior to the systems and methods described in this disclosure, large amounts of memory were required to be allocated to the task of joining datasets. In some cases, the input data itself may be altered (e.g., to achieve a desired sorted order), resulting in the risk of loss of data and decreased data reliability.

In one embodiment, a system includes a database server configured to receive input data from one or more data sources. The input data includes a data table, which includes records (e.g., rows of the data table). Each record includes, or is associated with, a record key and one or more entries. Each of the one or more entries is associated with a corresponding column key of the data table. The server receives instructions for sorting the input data according to the first column key. The instructions indicate an order in which to sort the input data. In response to receipt of the instructions, the server generates, based on the order indicated by the instructions, a first pluggable sorting index associated with a first column key of the data table. The first pluggable sorting index includes the record keys arranged in a sorted order according to sortable properties of entries associated with the first column key. The sortable properties of the entries associated with the first column key are alphanumeric characters included in the entries. The alphanumeric characters can be sorted in one or both of a numerical and an alphabetical order. The server generates a first sorted dataset, based on the data table and the first pluggable sorting index. The first sorted dataset includes the entries associated with the first column key arranged according to the sorted order of the first pluggable sorting index.

In another embodiment, a system includes a database server configured to receive a first dataset. The first dataset includes a first plurality of data blocks, where each of the first plurality of data blocks includes a set of first records. Each first record is associated with a corresponding first record key. The server receives a second dataset, which includes a second plurality of data blocks. Each of the second plurality of data blocks includes a set of second records, and each second record is associated with a corresponding second record key. The server receives instructions to join the first dataset and the second dataset. The database server includes a sorter configured to, in response to receipt of the instructions, sort the first dataset and the second dataset such that the set of first records for each first data block is arranged based on values of the first record keys and the set of second records for each second data block is arranged based on values of the second record keys. The server further includes a joiner configured to extract a first root element from the first dataset. The first root element includes the first record key with the greatest value among the first record keys. The joiner extracts a second root element from the second dataset. The second root element includes the second record key with the greatest value among the second record keys. The joiner determines whether the first and second root elements match. In response to determining that the first and second root elements match, the joiner generates an output by joining the first record associated with the first root element with the second record associated with the second root element.

The systems described in the present disclosure provide technical solutions to the technical problems of previous systems, including those described above, by facilitating the efficient sorting and/or joining of data. The disclosed systems and methods provide several advantages which include 1) efficient and effective generation of appropriately sorted and/or joined datasets or data streams with decreased memory consumption and processing costs, 2) effective data sorting without duplication and/or alteration of input data (and without the associated risk of data loss and decreased data integrity), and 3) generation of a joined output as a data stream, which may be accessed and/or transmitted as it is generated. As such, the system described in the present disclosure may improve the function of computer systems used for sorting information stored in a distributed database and combining information found in multiple datasets by providing efficient approaches to sorting data and joining datasets. The systems and methods may also reduce or eliminate technological bottlenecks to the analysis of large datasets. For example, the output of the described systems may facilitate the efficient generation of appropriately sorted and joined datasets for effective analysis, which was otherwise impossible using previously available technology. The systems described in the present disclosure may also be integrated into a variety of practical applications for automatic sorting of large datasets without surpassing available memory and processing capacities and for efficiently joining sorted datasets in a stream-wise fashion without storing superfluous records that are not used in the joined output data stream.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

As described above, prior to the present disclosure, there was a lack of tools for effectively and reliably sorting and joining data stored in distributed databases. As described with respect to illustrative examples of FIGS. 1-4 below, the present disclosure facilitates the efficient generation of sorted and/or joined data from input data, which may, in some embodiments, be stored in a distributed database server.

Figure 1:
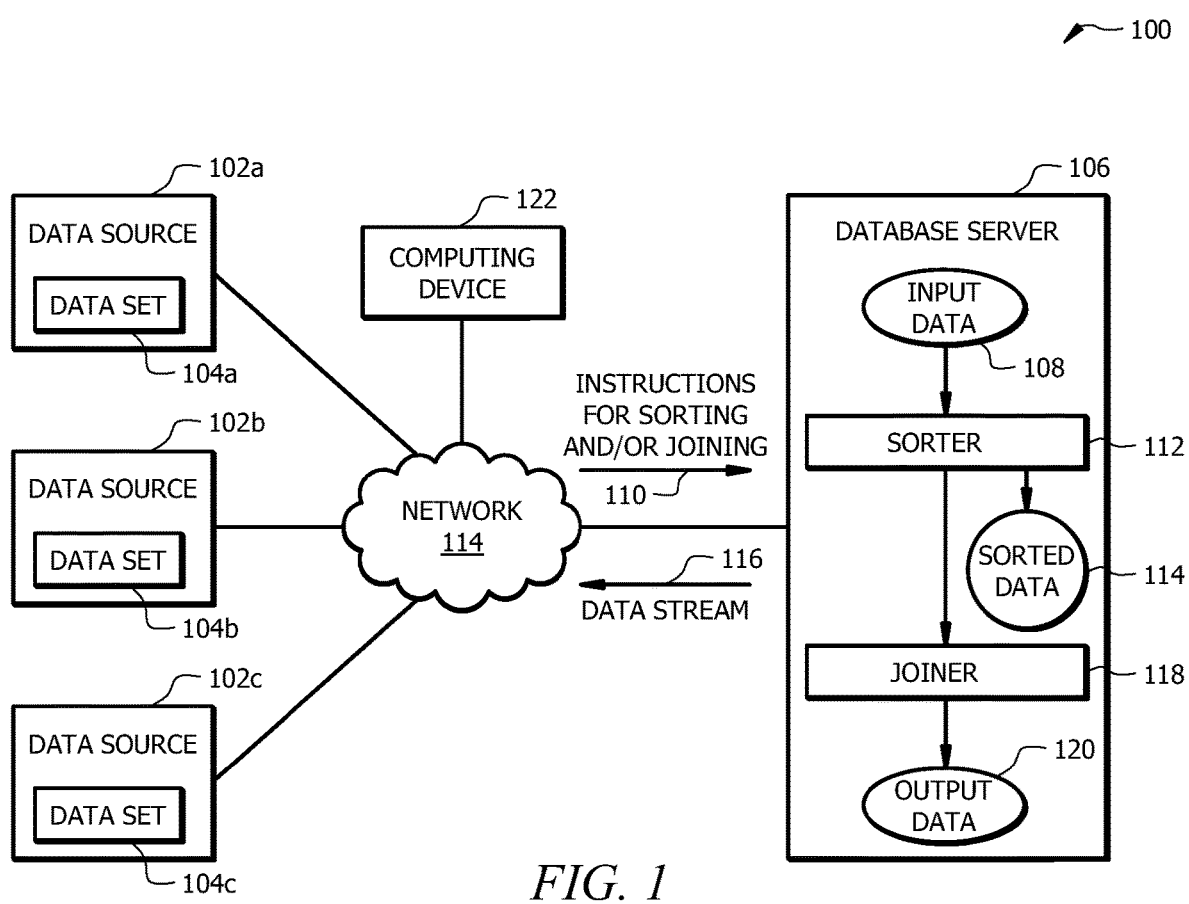
FIG. 1 is a schematic diagram of a database system, according to an illustrative embodiment of this disclosure.

FIG. 1 is a diagram of a database system 100, according to an illustrative embodiment of the present disclosure. The database system 100 includes one or more data sources 104a-c, a database server 106, a computing device 122, and a network 124. The database system 100 is generally configured to generate, via the database server 106, sorted data 114 and/or output data 120 based on input data 108, which may include information from one or more of the datasets 104a-c received from data sources 102a-c. The uniquely configured database server 106 may facilitate efficient data sorting using sorter 112 and efficient joining of sorted data 114 using joiner 118 to generate output data 120. The database system 100 may be configured as shown or in any other suitable configuration.

The data sources 102a-c include sources (e.g., data repositories, computing devices, etc.) of datasets 104a-c. Each of the datasets 104a-c may include data stored in any format and in any file type that may be accessed by the database server 106. Datasets 104a-c may include one or more data tables, which may be received as input data 108 (or compiled to generate input data 108) by database server 106. Example data tables are described in greater detail below with respect to FIG. 2. The data sources 102a-c are generally any devices configured to store corresponding datasets 104a-c and provide datasets 104a-c to the database server 106 (e.g., via network 124). For example, one or more of the data sources 102a-c may be a computing device configured to store the corresponding datasets 104a-c and transmit the datasets 104a-c to database 106, or facilitate retrieval or extraction of the datasets 104a-c by the database server 106. In some embodiments, each of the data sources 102a-c may be associated with a unique entity. For example, data source 102a may be associated with an individual business (e.g., such that dataset 104a includes information about transactions at a store, for example, from one or more cash registers), data source 102b may be associated with an individual (e.g., such that dataset 104b may include information about the individual, for example, from a customer profile), and data source 102c may be associated with groups of entities (e.g., such that dataset 104a includes information about the group). Each of data sources 104a-c may be located in a different geographical location. While three data sources 102a-c are depicted in the example of FIG. 1, it should be understood that system 100 may include anywhere from one to hundreds, thousands, or more data sources. Each of the data sources 102a-c may be implemented using the hardware, memory, and interfaces of device 400 described with respect to FIG. 4 below.

The database server 106 generally includes at least one computing device and is configured to receive one or more of the datasets 104a-c (or portions thereof) as input data 108. In general, the database server 106 may be a standalone server or a distributed server (e.g., executed on a plurality of local and/or distributed devices or as a cluster of devices). The input data 108 may include all or a portion of the datasets 104a-c. The input data may include one or more tables (e.g., such as data tables 200, 212, 214, 216 of FIG. 2) and may be stored as a plurality of data blocks (e.g., the data blocks 308a-e and 312a-h of FIG. 3) to facilitate distribution of the input data 108 in a distributed database server The database server 106 may receive or access instructions 110 for sorting and/or joining the input data 108. For example, the instructions 110 may indicate which information should be sorted in the input data 108 (e.g., which subset of the input data 108 should be sorted) and rules for sorting the input data 108 (e.g., whether the data should be sorted in ascending or descending order, e.g., whether the data should be sorted based on numerical characters or alphabetical characters, or both). As another example, the instructions 110 may be associated with which information should be joined in the input data 108. While instructions 110 may be received from an external source (e.g., via network 124, as shown in the illustrative example of FIG. 1), the instructions 110 may alternatively be "received" by accessing predefined sort and/or join instructions 110 stored in the database server 106. Accessing predefined instructions 110 may, for example, allow input data 108 to be sorted and/or joined automatically (e.g., based on a predefined schedule and/or program—see scheduling data 412 of FIG. 4 below), without requiring that instructions be provided from other components or individuals. Database server 106 may be implemented using the hardware, memory, and interfaces of device 400 described with respect to FIG. 4 below.

The sorter 112 of database server 106 is generally configured to sort the input data 108, based on instructions 110, to generate sorted data 114. For example, information in the input data 108 may be sorted based on a particular feature, or sortable property, of the input data 108. For example, information in the datasets may be sorted according to properties of alphanumeric characters included in entries associated with sortable records of the datasets (e.g., based on a numerical or alphabetical order of the characters). For instance, records (e.g., rows of information stored in data tables) of the input data 108 may be sorted in a predefined order. The predefined order may be an ascending or descending order and may be one or both of a numerical and/or an alphabetical order. In general, records in the input data 108 may be sorted based on any sortable property. For example, records may be sorted based on corresponding entries that include names or any other alphanumeric strings, which may be arranged in alphabetical order (e.g., either ascending from A to Z or descending from Z to A). Likewise, records may be sorted according to values of corresponding numerical entries, which may be arranged in numerical order (e.g., ascending from lowest to highest or descending from highest to lowest). In some cases, records may be sorted according to corresponding entries that include both alphabetical and numerical characters by first sorting in alphabetical order and then sorting in numerical order (or vice versa, as desired). In some embodiments, the sorter 112 is configured to perform pluggable sorting as described in greater detail below with respect to FIG. 2.

In such embodiments, the sorter 112 may particularly facilitate efficient and rapid sorting of the input data 108 without duplicating, altering, or otherwise modifying the input data 108 in any way. Such embodiments may, for example, facilitate accessing the input data 108 in a sorted "view," such that the data 108 is effectively accessed, or "viewed," as sorted data 114 without requiring a separate copy of data 108.

The joiner 118 is generally configured to join datasets of the input data 108 based on joining instructions 110. The joiner 118 joins input data 108, or appropriately sorted data 114, to generate output data 120. As described in greater detail with respect to FIG. 3 below, joining datasets may involve, for example, combining records from two or more datasets that have matching record keys, while discarding records that lack a matching record key in the other dataset. In some cases, the joiner 118 may be referred to as a reducer, as datasets are not only joined but the overall size of the output data 120 may be less than that of the input data 108 (e.g., because un-joined data may be discarded). In some embodiments, the joiner 118 may facilitate the generation of output data 120 in a stream-wise, or sequential, fashion as data stream 116 (e.g., as described with respect to FIG. 3 below). This may facilitate access to output data 120 as it is generated (e.g., in near real-time), rather than requiring the entire join process to be completed before the output data 120 can be accessed. Data stream 116 may be transmitted as the output data 120 is generated to a separate computing device 122 for further analysis or inspection. An example implementation of the joiner 118 is described in greater detail below with respect to FIG. 3.

Computing device 122 is generally any device configured to receive information from the database server 106 (e.g., via network 124). For example, computing device 122 may receive the output data 120 and/or data stream 116 generated by the database server 106. Device 122 may be a stand-alone device such as a personal computer or mobile device or may be a computing tool for analyzing output data 120. As such, device 122 may be a server, for example, configured for big data analysis (e.g., big data analysis) of output data 120. Device 122 may be configured to receive each newly generated portion of the output data 120 sequentially (e.g., in portions) in the form of data stream 116 as the output data 120 is generated. Generally, device 122 may be implemented using the hardware, memory, and interfaces of device 400 described with respect to FIG. 4 below.

Network 124 facilitates communication between and amongst the various components of the database system 100. This disclosure contemplates network 124 being any suitable network operable to facilitate communication between the components of the system 100. Network 124 may include any interconnecting system capable of transmitting audio, video, signals, data, messages, or any combination of the preceding. Network 124 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Example implementations of sorter 112 configured for pluggable sorting and joiner 118 configured to generate output data 120 for inclusion, as it is generated, in data stream 116 are described with respect to FIGS. 2 and 3, respectively, in the subsections below.

Pluggable Sorting

As described above with respect to the example of FIG. 1, in some embodiments, the sorter 112 is configured for pluggable sorting of input data 108 to generate sorted data 114. To perform pluggable sorting, the sorter 112 generally employs unique sorting indices, which correspond to the sorted order of information stored in various columns of data tables included in input data 108. Pluggable sorting facilitates efficient and automatic sorting of input data 108. Thus, rather relying on duplication and/or manipulation of input data 108 itself, the sorted data 114 can be automatically generated, or "viewed," using the innovative sorting indices described in this disclosure.

Figure 2:
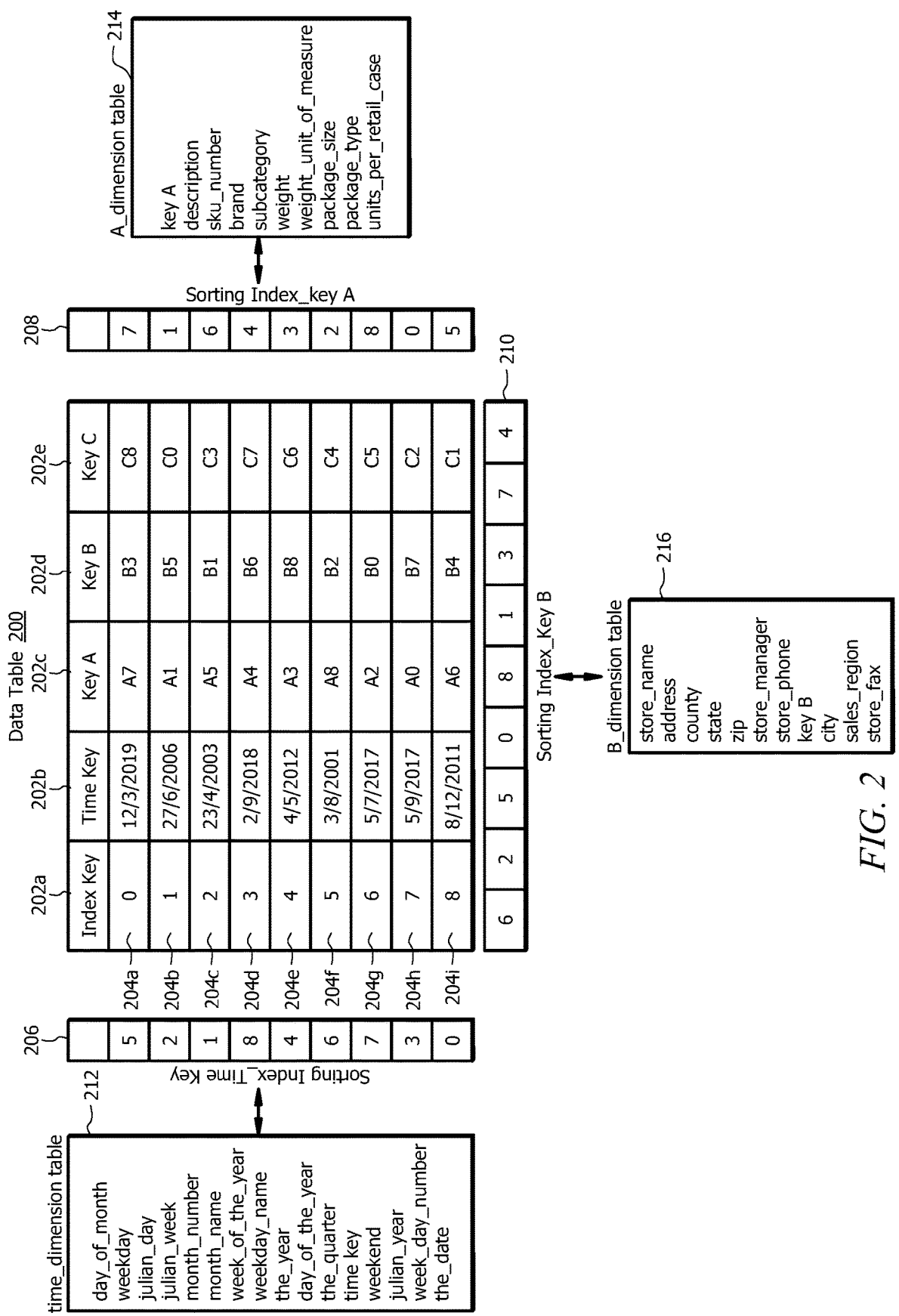
FIG. 2 is a schematic diagram illustrating an example of pluggable data sorting using the system illustrated in FIG. 1.

FIG. 2 illustrates an example implementation of sorter 112 configured for pluggable sorting. Data table 200 and the associated dimension tables 212, 214, 216 are included in input data 108 of FIG. 1. Data table 200 includes records 204a-i (e.g., rows of the data table 200). Each record 204a-i generally includes a record key (i.e., corresponding to the "Record Key" column 202a of data table 200). Each record key may be any appropriate alphanumeric character or string identifying the corresponding record. For example, a record key may be a customer identifier, and each record 204a- includes entries associated with the customer corresponding to the customer identifier.

In the example of table 200, the records 204a-i are arranged in ascending order of their corresponding record keys (i.e., from 0 to 8). Each record 204a-i also has at least one entry, which is associated with a corresponding column key (e.g., a column identifier associated with columns 202b-e of the data table 200) and includes information associated with the record and the column key. In other words, each of records 204a-i includes a record key (in column 202a) and entries (in columns 202b-e). Each column 202b-e has a corresponding column key (i.e., "Time key" for column 202b, "Key A" for column 202c, "Key B" for column 202d, and "Key C" for column 202e). The entries in each column are associated with the corresponding column key (e.g., entries A0 to A8 are associated with the column key "Key A").

A column key may also be associated with a corresponding dimension table (e.g., one of dimension tables 212, 214, 216 of FIG. 2) which stores additional information related to the column key. For example, the time dimension table 212, the Key A dimension table 214, and the Key B dimension table 216 are associated with the Time Key of column 202b, Key A of column 202c, and Key B of column 202c, respectively. This dimension table-based structure allows additional information associated with each column key to be stored in separate tables, thereby preventing any one table from becoming too large or unwieldy for storage or manipulation. This approach may also facilitate storage of data 108 in database server 106 when server 106 is a distributed server.

As an example, if data table 200 stores customer information, the record keys (i.e., numbers 0 to 8 in column 202a) may correspond to customer identifiers and the entries associated with Key A, Key B, and Key C may correspond to product information, customer information, and promotional offer information, respectively. For instance, record 204c, which has a record key value of 2, may include a first entry corresponding to the Time Key of column 202b of "23, Oct. 2003" (e.g., the date on which a transaction occurred), a second entry corresponding to Key A of column 202c of "A5" (e.g., a product code for a product purchased on this date), a third entry corresponding to Key B of column 202d of "B1" (e.g., a store identifier for the store at which the product was purchased), and a fourth entry corresponding to Key C of column 202d of "C3" (e.g., corresponding to any other information describing the customer and/or his/her transaction).

The sorter 112 may generate a pluggable sorting index (e.g., one or more of the example indices 206, 208, 210) for any one or more of the column keys of table 200. Each pluggable sorting index is associated with a corresponding column key of the data table 200 and includes information for automatically sorting records 204a-i according to sortable properties of the entries. The sortable properties may be the values of numbers included in the entries (e.g., to sort in ascending or descending numerical order) and/or the letters included in the entries (e.g., to sort in ascending or descending alphabetical order). A pluggable sorting index may be generated by identifying criteria that are to be used to sort information in the input data 108. For example, the sorting criteria may be provided as part of instructions 110 and may indicate how records should be sorted (e.g., in ascending or descending numerical or alphabetical order). From these, criteria a sorted order of the record keys of column 202a may be determined for the column keys of table 200. The pluggable sorting indices (e.g., indices 206, 208, 210) are generated as arrays which include the record keys arranged in the sorted order.

For instance, in the example of FIG. 2, a first pluggable sorting index 206 is associated with the "Time Key" (column 202b) and is an array of the record keys (i.e., of column 202a) arranged according to a sorted order of the entries in column 202b for the Time Key. For example, the entries "5, 2, 1, 8, 4, 6, 7, 3, 0" of the sorting index 206 correspond to the record keys of column 202a arranged such that the entries of column 202b are sorted in ascending order from earliest to latest date. For example, record 204f with record key 5 (i.e., the first entry in the pluggable sorting index 206) includes an entry with the earliest date ("3/8/2001") in column 202b, and record 204c with record key 2 (i.e., the second entry in pluggable sorting index 206) stores the next earliest date ("23/4/2003") in column 202b. As further examples, the pluggable sorting indices 208 and 210 include record keys arranged in an order corresponding to sorting the entries associated with Key A (in column 202c) and Key B (in column 202d) in ascending order (i.e., from A1 to A7 for Key A and from B1 to B7 for Key B). The pluggable sorting indices 206, 208, 210 may also be used to sort entries in the associated dimension tables 212, 214, 216. For example, the sorting index 206 for the Time Key may be used to sort records in the time dimension table 212. After being generated, the pluggable sorting index may be stored for future use with the same data table 200 or a different data table that includes the same column key (i.e., pluggable sorting index 206 can generally be used with other data tables that employ the same column key).

In general, each of the pluggable sorting indices 206, 208, 210 can be used to automatically access or "view" the entries in the corresponding columns 202b, 202c, 202d (and optionally additional information stored in the corresponding dimension tables 212, 214, 216) in a sorted order without modifying (e.g., rearranging) the order of the records 204a-i in table 200 (or the associated dimension tables 212, 214, 216). Referring again to FIG. 1, this may facilitate efficient use, visualization, or analysis of the input data 108 without the processing or memory usage overhead required by previous technologies. The database server 106 may use this "sorted view" to generate sorted data 114. Alternatively, sorted data 114 may represent the sorted view of the input data 108 using the pluggable indices 206, 208, 210, rather than being a separate sorted copy of data 108.

Referring again to FIG. 1, in an example implementation of the sorter 112, instructions 110 to sort input data 108 according to the Time Key with entries sorted in ascending order is received by the database server 106. In response to receipt of instructions 110, the sorter 112 accesses data table 200 and the time key dimension table 212 (i.e., the data associated with the sort instructions 110). The sorter 112 may determine whether a sorting index is available for performing tasks associated with sort instructions 110 (e.g., whether the pluggable sorting index 206 associated with the Time Key has already been generated and stored in server 106). If pluggable sorting index 206 is not available, the sorter 112 generates the pluggable sorting index 206 as described above.

The pluggable sorting index 206 is then used to generate sorted data 114 from data table 200 and, optionally, from information stored in time dimension table 212. For instance, the sorted data may include the records 204a-i of table 200 arranged, using sorting index 206, according to the order of the entries of pluggable sorting index 206. For instance, the records 204a-i may be arranged in the following order: 204f (record key 5), 204c (record key 2), 204b (record key 1), 204i (record key 8), 204e (record key 4), 204g (record key 6), 204h (record key 7), 204d (record key 3), 204a (record key 0). The sorted data 114 may also include information from the associated dimension table 212 arranged in the same sorted order. For example, the sorted data 114 may include columns of entries associated with "day_of_month," "weekday," etc., as shown in FIG. 2. Sorted data 114 may be stored or provided to computing device 122 for further analysis.

Joiner for Data Stream Output Generation

As described above with respect to the example of FIG. 1, in some embodiments, the joiner 118 is configured to join a first and second dataset from input data 108 to efficiently and effectively generate joined output 120, which may be provided, as it is generated, via data stream 116. FIG. 3 illustrates the operation of a joiner 300. The joiner 118 of FIG. 1 may be joiner 300.

The joiner 300 is configured to receive instructions 110 to join a first dataset 304 and a second dataset 306 at step 302. For instance, the instructions 110 may indicate which portions of the datasets 304 and 306 should be joined and included in the output of the joiner (e.g., as part of output data 120 and/or data stream 116). The instructions 110 may be received from an external source (e.g., from a user operating device 122 and indicating a particular join of the datasets 304 and 306) or may be accessed from memory (e.g., at a time based on scheduling data 412 of FIG. 4).

Each of the first dataset 304 and the second dataset 306 generally includes a portion of the input data 108 described above with respect to FIG. 1. For example, each of the datasets 304, 306 may include all or a portion of the information included in datasets 104a-c of FIG. 1. As another example, dataset 304 may include all or a portion of dataset 106a received from data source 104a, and dataset 306 may include all or a portion of dataset 106b received from data source 104b. As illustrated in FIG. 3, dataset 304 includes a plurality of data blocks 308a-e. Each data block 308a-e includes records 310a-e with corresponding record keys (e.g., represented by the numbers corresponding to each of records 310a-e). As an example, each of the data blocks 308a-e may store a data table or a portion of a data table (e.g., such as tables 200, 212, 214, 216 of FIG. 2, described above). In other words, records 310a-e may correspond to rows of entries in the data tables. Similarly, dataset 306 includes data blocks 312a-h, and each data block 312a-h includes corresponding records 314a-h. Each record 314a-h includes a corresponding record key. In the example of FIG. 3, only a single record key is shown for each of the sets of records 314a-h for clarity. As described in greater detail below, the joiner 300, among other things, compares values of the record keys of records 310a-e from the first dataset 304 and records 314a-h from the second dataset 306 to more efficiently join portions of the first and second datasets 304 and 306 than was possible using previously available technology.

At step 316, the datasets 304, 306 may be sorted (e.g., if the datasets 34, 306 were not already sorted, for example, by sorter 112 of FIG. 1). The same sorting instructions 110 are used to sort both datasets 304, 306, and both datasets 304, 306 are sorted based on the same record key. For example, the records 310a-e of data blocks 308a-e may be sorted in order of increasing record key values, as shown in the example of FIG. 3. Generally, sorting may be performed based on any appropriate property of the record keys as appreciated by one of ordinary skill in the art. In some embodiments, pluggable sorting, as described above with respect to FIG. 2, is used to sort each of datasets 304, 306. For example, rather than duplicating or manipulating the records 310a-e and 314a-h stored in datasets 304 and 306, a pluggable sorting index (e.g., such as one of the pluggable sorting indices 206, 208, 210 described above with respect to FIG. 2) may be used to automatically "view" the datasets 304, 306 in a sorted order. In some embodiments, the datasets 304, 306 may be sorted prior to being accessed or received by the joiner 300. In other words, datasets 304, 306 may be pre-sorted (e.g., by the sorter 112 of FIG. 1). In such embodiments, the datasets 304, 306 may correspond to a portion of the sorted data 114 of FIG. 1.

The set of record keys representing the initial (e.g., highest value) record keys of the sorted records 310a-e is referred to in this disclosure as a first "heap" 318. In the example of FIG. 3, the first heap 318 includes the record keys with the highest value for each of the data blocks 308a-e of dataset 304. However, it should be understood, that the first heap 318 may alternatively include the record keys for the records with the initial value for any other appropriate sorted order (e.g., with the lowest numerical values if dataset 304 were sorted in descending numerical order). Sorted dataset 306 also has a corresponding second heap 320, which includes the set of record keys representing the initial (e.g., highest value) record keys of the sorted records 314a-h.

Figure 3:
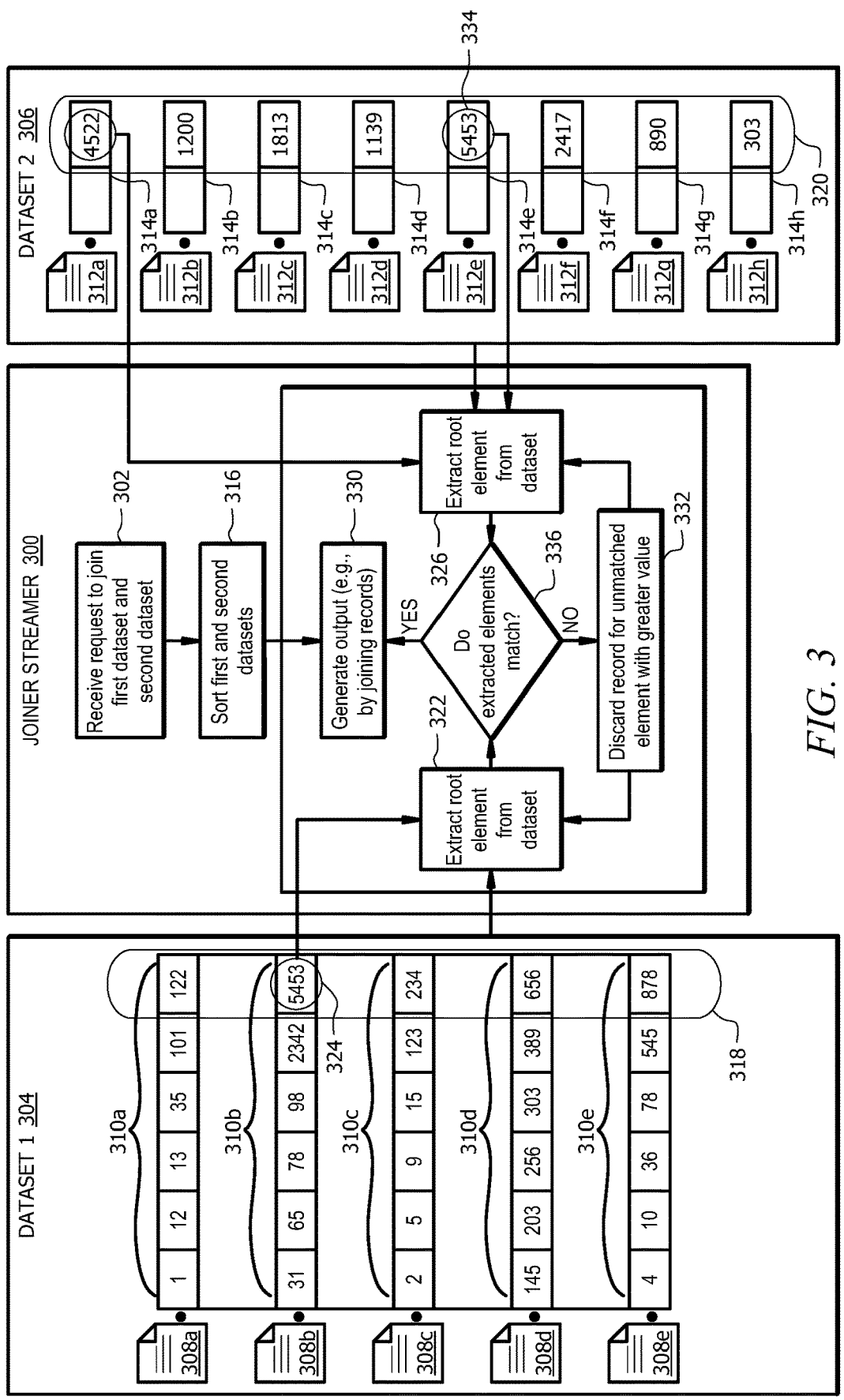
FIG. 3 is a diagram illustrating the joining of two datasets using the system illustrated in FIG. 1.

With datasets 304, 306 appropriately sorted for the identification of the first heap 318 and second heap 320, the joiner may proceed to subsequent steps to join datasets 304 and 306, as illustrated in FIG. 3. At step 322, the joiner 300 extracts a first root element 324 of the first heap 318. The first root element 324 is generally the element with the highest, or first, value (i.e., according to the sorting instructions 110 used to sort dataset 304). For example, the first root element 324 in the example of FIG. 3 is the record key from the first heap 318 with the largest numerical value of 5453. At step 326, the joiner 300 extracts a second root element 328 from the second heap 320 using the same or a similar process to that described above with respect to step 322. In the example of FIG. 3, the second root element is 9522.

At step 330, the joiner 300 compares the extracted first root element 324 to the extracted second root element 328. In the example of FIG. 3, the extracted first root element 324 is 5453, and the extracted second root element is 9522. Since these values are not equal, the extracted root elements 324 and 328 do not match. Since at step 330, the extracted first root element 324 and the extracted second root element 330 do not match, the joiner 300 proceeds to step 332 and discards the record associated with the root element with the larger value from the corresponding heap (i.e., the record corresponding to the second root element 330 is discarded). The joiner 300 then returns to step 326 and extracts the next root element 334 from the second heap 320. This newly extracted root element 334 is 5453 and matches the extracted first root element 324, which is also 5453. Thus, the joiner 300, having determined at step 330 that the root elements 324 and 334 match, generates output at step 336 by joining the records corresponding the first and second root elements 324 and 334.

Joining the record corresponding to the first root element 324 and the record corresponding to the second root element 334 may include, for example, accessing these records from the first and second datasets 304, 306 and appending the record corresponding to the second root element 334 to the record corresponding to the first root element 324. If the record corresponding to the second root element 334 includes one or more entries that are the same as those of the record corresponding to the first root element 324 (e.g., if the same column key appears in both datasets), these repeat entries may be removed (i.e., such that each entry only appears once). For instance, if the record key 5453 is a numerical customer identifier, the record corresponding to the first root element 324 may include a first set of customer information (e.g., dates of transactions with the customer as shown in the Time Key column 202b of Table 200 of FIG. 2) and a second set of customer information (e.g., associated with the time dimension table 212 and/or any of columns 202c-e of table 200 of FIG. 2). The generated output may be included in the output data 120 of FIG. 1, which may be transmitted or accessed as part of data stream 116, as output 120 is generated. The steps described above are generally repeated as appropriate until each record of the first and second datasets 304, 306 has been processed.

The unique functionality of the joiner 300 described above may facilitate the real-time transmission or access of joined data as it is generated, rather than requiring, as was the case in previous approaches, that the entirety of the first and second datasets 304, 306 be joined before the resulting data is available. The joiner 300 also utilizes fewer processing and memory resources than previous tools for joining datasets. For instance, once records are processed by the joiner 300 (e.g., whether included in the output or determined to not have a match in the other dataset), superfluous records may be removed from memory, thereby decreasing the amount of memory required for join operations.

Example Devices for Implementing the Database System

Figure 4:
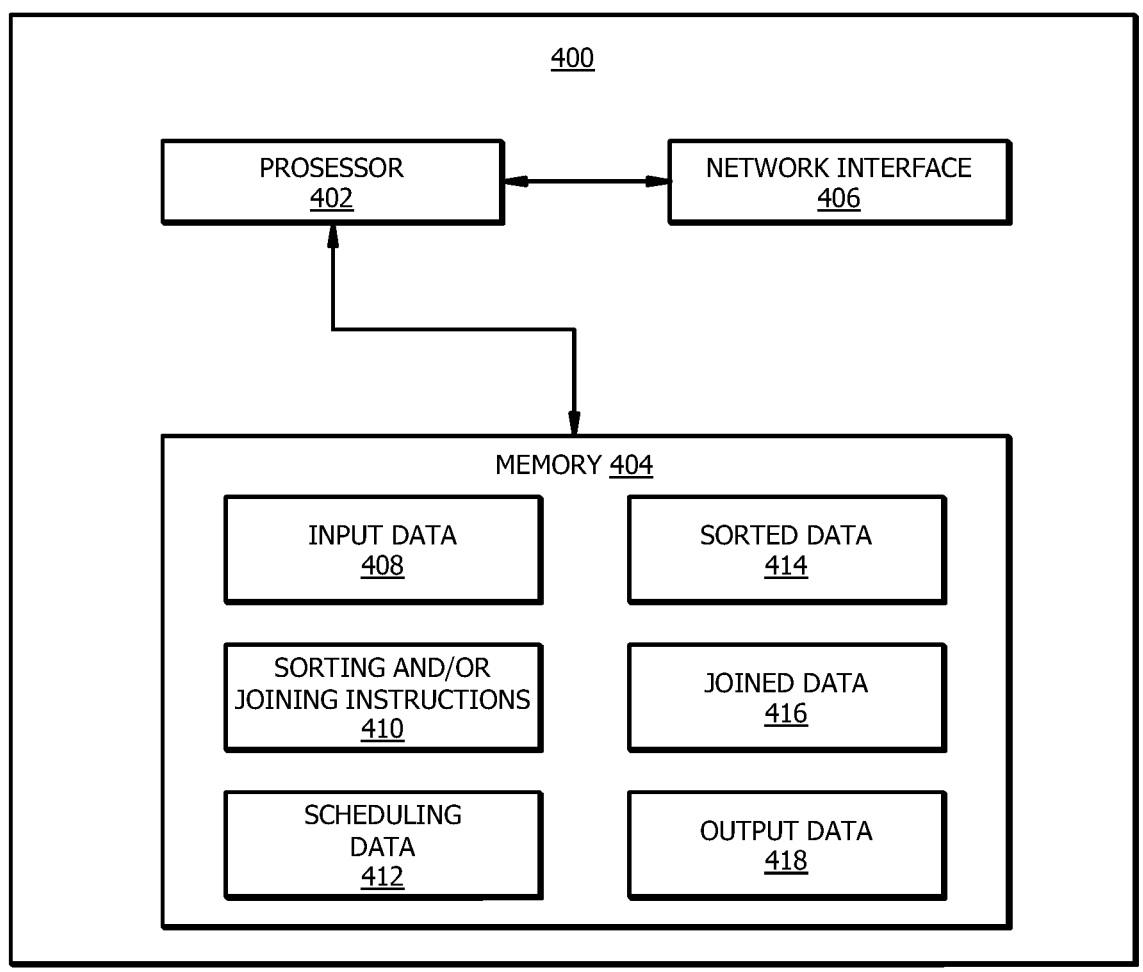
FIG. 4 is an embodiment of a device configured to implement the system illustrated in FIG. 1.

FIG. 4 is an embodiment of a device 400 configured to implement the database system 100. The device 400 comprises a processor 402, a memory 404, and a network interface 406. The device 400 may be configured as shown or in any other suitable configuration. The device 400 may be and/or may be used to implement any one or more of the data sources 102a-c, database server 106, and computing device 122 of FIG. 1.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of method 200. In an embodiment, the function described herein is implemented using logic units, FPGAs, ASICs, DSPs, or any other suitable hardware or electronic circuitry.

The memory 404 is operable to store input data 408, sort and/or join instructions 410, scheduling data 412, sorted data 414, joined data 416, output data 418, and/or any other data or instructions. The sort and/or join instructions 410 and scheduling data 412 may comprise any suitable set of instructions, logic, rules, or code operable to execute the function described herein. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The input data 408 generally includes but is not limited to the input data 108 of FIG. 1. For instance, the input data 408 may include other (e.g., previously) received or accessed data. As described above, the sort and/or join instructions 410 generally include rules and/or instructions for sorting the input data 408. For example, the sort and/or join instructions 410 may be the same as or provided as part of instructions 110 of FIG. 1. Accordingly, the sort and/or join instructions 410 may indicate how records should be sorted based on sortable properties of entries associated with the records (e.g., in ascending or descending numerical or alphabetical order). Sortable properties may be the values of numbers included in entries (e.g., to sort based on ascending or descending numerical value) and/or the letters included in entries (e.g., to sort based on ascending or descending alphabetical order).

The scheduling data 412 may include information and/or instructions for scheduling automatic operation of functions described in this disclosure. For instance, the scheduling data 412 may include times and dates at which particular input data 410 should be sorted and/or joined by the device 400 (i.e., when the device 400 is the database server 106 of FIG. 1). The sorted data generally includes but is not limited to the sorted data 114 described above with respect to FIG. 1. The joined data includes but is not limited to the output data 120 of FIG. 1 (i.e., the output of the joiner 118 of FIG. 1). The output data 418 may include all or portions of one or both of the sorted data 414 and the joined 416.

The network interface 406 is configured to enable wired and/or wireless communications (e.g., via network 124). The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a processor configured to:
receive a first dataset comprising a first plurality of data blocks, wherein each of the first plurality of data blocks comprises a set of first records, each first record associated with a corresponding first record key;
receive a second dataset comprising a second plurality of data blocks wherein each of the second plurality of data blocks comprises a set of second records, each second record associated with a corresponding second record key;
receive instructions for joining the first dataset and the second dataset;
the processor comprising:
a sorter configured to:
in response to receipt of the instructions, sort the first dataset and the second dataset, such that the set of first records for each first data block is arranged based on values of the first record keys and the set of second records for each second data block is arranged based on values of the second record keys; and a joiner configured to:
   extract a first root element from the first dataset, the first root element comprising the first record key with the greatest value among the first record keys,
   extract a second root element from the second dataset, the second root element comprising the second record key with the greatest value among the second record keys;
   determine whether the first and second root elements match; and
   in response to determining that the first and second root elements match, generate an output by joining the first record associated with the first root element with the second record associated with the second root element.

2. The system of claim 1, wherein the joiner is further configured to, in response to determining that the first and second root elements do not match:
   determine whether a first value of the first root element is greater than a value of the second root element;
   in response to determining the first value of the first root element is greater than the second value of the second root element:
      discard the first record corresponding to the first root element; and
      following discarding the first record corresponding to the first root element, extract a subsequent first root element from the first dataset, the subsequent first root element comprising the first record key with the next greatest value among the first record keys; and
   in response to determining the first value of the first root element is not greater than the second value of the second root element:
      discard the second record corresponding to the second root element; and
      following discarding the second record corresponding to the second root element, extract a subsequent second root element from the second dataset, the subsequent second root element comprising the second record key with the next greatest value among the second record keys.

3. The system of claim 1, the processor further configured to provide the generated output via a data stream.

4. The system of claim 3, the processor further configured to transmit the data stream to a computing device.

5. The system of claim 1, wherein the joiner is further configured to, following generating the output:
   discard the first record associated with the first root element from the first dataset; and
   discard the second record associated with the second root element from the second dataset.

6. The system of claim 1, wherein the joiner is further configured to extract the first root element from the first dataset by:
   identifying a first heap, the first heap comprising a set of the first record keys of the sorted first dataset with the greatest values;
   determining which of the first record keys of the first heap has the greatest value; and
   extracting the first record key with the greatest value as the first root element.

7. The system of claim 2, wherein the joiner is further configured to iteratively repeat the claimed functions until each of the first records and second records is either joined or discarded.

8. The system of claim 1, wherein the first dataset and the second dataset are received from different data sources.

9. A method comprising:
   receiving a first dataset comprising a first plurality of data blocks, wherein each of the first plurality of data blocks comprises a set of first records, each first record associated with a corresponding first record key;
   receiving a second dataset comprising a second plurality of data blocks wherein each of the second plurality of data blocks comprises a set of second records, each second record associated with a corresponding second record key;
   receiving instructions for joining the first dataset and the second dataset;
   in response to receiving the instructions, sorting the first dataset and the second dataset, such that the set of first records for each first data block is arranged based on values of the first record keys and the set of second records for each second data block is arranged based on values of the second record keys;
   extracting a first root element from the first dataset, the first root element comprising the first record key with the greatest value among the first record keys,
   extracting a second root element from the second dataset, the second root element comprising the second record key with the greatest value among the second record keys;
   determining whether the first and second root elements match;
   in response to determining that the first and second root elements match, generating an output by joining the first record associated with the first root element with the second record associated with the second root element.

10. The method of claim 9, further comprising, in response to determining that the first and second root elements do not match:
   determining whether a first value of the first root element is greater than a value of the second root element;
   in response to determining the first value of the first root element is greater than the second value of the second root element:
      discarding the first record corresponding to the first root element; and
      following discarding the first record corresponding to the first root element, extracting a subsequent first root element from the first dataset, the subsequent first root element comprising the first record key with the next greatest value among the first record keys; and
   in response to determining the first value of the first root element is not greater than the second value of the second root element:
      discarding the second record corresponding to the second root element; and
      following discarding the second record corresponding to the second root element, extracting a subsequent second root element from the second dataset, the subsequent second root element comprising the second record key with the next greatest value among the second record keys.

11. The method of claim 9, further comprising provide the generated output via a data stream.

12. The method of claim 11, further comprising transmitting the data stream to a computing device.

13. The method of claim 9, further comprising:
discarding the first record associated with the first root element from the first dataset; and
discarding the second record associated with the second root element from the second dataset.

14. The method of claim 9, further comprising extracting the first root element from the first dataset by:
identifying a first heap, the first heap comprising a set of the first record keys of the sorted first dataset with the greatest values;
determining which of the first record keys of the first heap has the greatest value; and
extracting the first record key with the greatest value as the first root element.

15. The method of claim 9, wherein the first dataset and the second dataset are received from different data sources.

16. A system for automatically joining a first and second dataset, the system comprising a processor configured to:
access a first sorted dataset comprising a first plurality of data blocks, wherein each of the first plurality of data blocks comprises a set of first records, each first record associated with a corresponding first record key, wherein the set of first records for each first data block is arranged based on values of the first record keys;
access a second sorted dataset comprising a second plurality of data blocks wherein each of the second plurality of data blocks comprises a set of second records, each second record associated with a corresponding second record key, wherein the set of second records for each second data block is arranged based on values of the second record keys;
extract a first root element from the first sorted dataset, the first root element comprising the first record key with the greatest value among the first record keys,
extract a second root element from the second sorted dataset, the second root element comprising the second record key with the greatest value among the second record keys;
determine whether the first and second root elements match; and
in response to determining that the first and second root elements match, generate an output by joining the first record associated with the first root element with the second record associated with the second root element.

17. The system of claim 16, wherein the processor is further configured to, in response to determining that the first and second root elements do not match:
determine whether a first value of the first root element is greater than a value of the second root element;
in response to determining the first value of the first root element is greater than the second value of the second root element:
discard the first record corresponding to the first root element; and
following discarding the first record corresponding to the first root element, extract a subsequent first root element from the first sorted dataset, the subsequent first root element comprising the first record key with the next greatest value among the first record keys; and
in response to determining the first value of the first root element is not greater than the second value of the second root element:
discard the second record corresponding to the second root element; and
following discarding the second record corresponding to the second root element, extract a subsequent second root element from the second sorted dataset, the subsequent second root element comprising the second record key with the next greatest value among the second record keys.

18. The system of claim 16, the processor further configured to provide the generated output via a data stream.

19. The system of claim 16, wherein the processor is further configured to, following generating the output:
discard the first record associated with the first root element from the first sorted dataset; and
discard the second record associated with the second root element from the second sorted dataset.

20. The system of claim 16, wherein the processor is further configured to extract the first root element from the first dataset by:
identifying a first heap, the first heap comprising a set of the first record keys of the sorted first sorted dataset with the greatest values;
determining which of the first record keys of the first heap has the greatest value; and
extracting the first record key with the greatest value as the first root element.

* * * * *